(12) United States Patent
Fry

(10) Patent No.: US 6,880,125 B2
(45) Date of Patent: Apr. 12, 2005

(54) SYSTEM AND METHOD FOR XML PARSING

(75) Inventor: Chris Fry, Berkeley, CA (US)

(73) Assignee: Bea Systems, Inc., San Jose, CA (US)

(*) Notice: Subject to any disclaimer, the term of this patent is extended or adjusted under 35 U.S.C. 154(b) by 0 days.

(21) Appl. No.: 10/304,280

(22) Filed: Nov. 26, 2002

(65) Prior Publication Data

US 2003/0159112 A1 Aug. 21, 2003

Related U.S. Application Data

(60) Provisional application No. 60/358,419, filed on Feb. 21, 2002.

(51) Int. Cl.[7] .............................................. G06F 15/00
(52) U.S. Cl. ..................................... 715/513; 719/328
(58) Field of Search ........................... 715/513; 719/328

(56) References Cited

U.S. PATENT DOCUMENTS

| | | | |
|---|---|---|---|
| 6,125,391 A | | 9/2000 | Meltzer et al. .............. 709/223 |
| 6,516,322 B1 | | 2/2003 | Meredith .................... 707/102 |
| 6,718,371 B1 | * | 4/2004 | Lowry et al. ............... 709/213 |
| 6,772,206 B1 | * | 8/2004 | Lowry et al. ............... 709/223 |
| 2001/0056504 A1 | | 12/2001 | Kuznetsov |
| 2002/0049603 A1 | | 4/2002 | Mehra et al. |
| 2002/0073399 A1 | | 6/2002 | Golden |
| 2002/0085020 A1 | | 7/2002 | Carroll, Jr. |
| 2002/0111963 A1 | | 8/2002 | Gebert et al. |
| 2002/0122054 A1 | | 9/2002 | Hind et al. |
| 2002/0165872 A1 | | 11/2002 | Meltzer et al. |
| 2002/0184145 A1 | | 12/2002 | Sijacic et al. |
| 2003/0005410 A1 | | 1/2003 | Harless |
| 2003/0018661 A1 | | 1/2003 | Darugar |
| 2003/0023628 A1 | * | 1/2003 | Girardot et al. ............ 707/513 |
| 2003/0055875 A1 | | 3/2003 | Carter |
| 2003/0159111 A1 | | 8/2003 | Fry |
| 2003/0163603 A1 | | 8/2003 | Fry et al. |
| 2003/0167356 A1 | * | 9/2003 | Smith et al. ................ 709/328 |

OTHER PUBLICATIONS

Sosnoski, Dennis, "XML Documents on the Run, Part 1, SAX speeds through XML documents with parse-event streams", Feb. 8, 2002, Available: http://www.javaworld.com/javaworld/jw-02-2002/jw-0208-xmljava_p.html.*

XMLBooster, Phidani Software, May 10, 2001, Available: http://www.xml.com/pub/r/1085.*

Simpson, John, "Choosing an XML Parser", Aug. 28, 2000, Available: http://www.xml.com/lpt/a/2000/08/23/which-parser/index.html.*

XMLBooster Home Page, Nov. 27, 2001, available at:http://web.archive.org/web/20011127084440/http://www.xml-booster.com.*

Kumar, Pankaj, XPB4J User Guide, Version 8.0, Oct. 3, 2001.*

Cable, Larry, Java API for XML Parsing Specification Version 1.0, Nov. 16, 1999.*

(Continued)

*Primary Examiner*—Joseph Feild
*Assistant Examiner*—Rachna Singh
(74) *Attorney, Agent, or Firm*—Fliesler Meyer LLP

(57) ABSTRACT

Broad XML support is obtained through use of a set of streaming parser APIs. An application or client needing access to an XML document can contact an XML parser, XML processor, or XML reader in order to gain access to the document. The XML processor selects and instantiates a streaming parser API that is appropriate for the XML document and the client or application. Streaming parser APIs include raw streaming parser APIs, non-validating streaming parser APIs, and validating streaming parser APIs. The XML parser can then provide a variety of types of access to the application or client that does not require the entire document to be read into memory, including providing an XML stream, pulling XML information, and skipping unwanted XML from the document.

17 Claims, 3 Drawing Sheets

OTHER PUBLICATIONS

U.S. Appl. No. 10/304,207, filed Nov. 26, 2002, Fry et al.

Silominski, Aleksander and Stefan Hausten MXPI: xml pull parser, XML.com, Apr. 29, 2002, http://www.xml.com/pub/r/1352.

Sosnoski, Dennis M. *XML Documents on the Run, Part 2*, Javaworld.com, Mar. 29, 2002, http://www.javaworld.com/javaworld/jw–03–2002/jw–0329–xmljava2_p.html.

Sosnoski, Dennis M. XML Documents on the Run, Part 3, Javaworld.com, Apr. 26, 2002, http://www.javaworld.com/javaworld/jw–04–2002/jw–0426–xmljava3_p.html.

* cited by examiner

SYSTEM AND METHOD FOR XML PARSING

CLAIM OF PRIORITY

This application claims priority to U.S. Provisional Patent Application No. 60/358,419, filed Feb. 21, 2002, entitled "SYSTEM AND METHOD FOR XML PARSING", which is hereby incorporated herein by reference.

CROSS-REFERENCED CASES

The following applications are cross-referenced and incorporated herein by reference:

U.S. patent application Ser. No. 10/304,353 entitled "SYSTEM AND METHOD FOR XML DATA BINDING" by Chris Fry and Scott Ziegler, filed Nov. 26, 2002.

U.S. patent application Ser. No. 10/304,233 entitled "SYSTEM AND METHOD FOR FAST XSL TRANSFORMATION" by Chris Fry, filed Nov. 26, 2002.

U.S. patent application Ser. No. 10/304,207 entitled "SYSTEM AND METHOD FOR XML DATA BLINDING" by Chris Fry and Sam Pullara, filed Nov. 26, 2002.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

TECHNICAL FIELD

The invention relates generally to a system and method for processing XML documents.

BACKGROUND

XML is quickly becoming a core technology for interoperability and data manipulation, and parsing XML has become a standard function in most computing environments. Two main approaches exist at the present time. One of these approaches is the Simple API for XML Processing, or "SAX". The other approach is the Document Object Model, or "DOM". Each of these approaches has certain benefits and drawbacks, although SAX presently has more momentum as an XML processing API. Efficient XML processing can be fundamental to a server. As more documents become XML based, more traffic on the server will be XML. The latest push into web services currently utilizes the Simple Object Access Protocol (SOAP) as a transport. SOAP is a lightweight, XML-based protocol for exchanging information in a decentralized, distributed environment. This push has highlighted the need for fast, solid XML processing. Web services can utilize XML over HTTP as the transport for remote procedure calls. If the XML parser is slow, these calls cannot be made in a timely manner.

To use SAX, one writes handlers, or objects that implement the various handler APIs, which receive callbacks during the processing of an XML document. Some of the main benefits of this style of XML document processing include efficiency, flexibility, and the fact that this approach is relatively low level. It is possible to change handlers during the processing of an XML document, which allows one to use different handlers for different sections within the same document. One drawback to the SAX API is that the programmer must keep track of the current state of the document in the code each time one processes an XML document. This can be an unacceptable amount of overhead for XML processing, and can lead to convoluted document processing code.

DOM, on the other hand, loads an entire XML document into memory and provides APIs to the programmer to manipulate the DOM tree. At first glance, this might seem like a win for the application developer as the developer does not have to write specific parsing code. Unfortunately, this simplicity can take a very serious hit on performance. An entire document must be read into memory, so for very large documents one must read the entire document into memory before taking appropriate actions based on the data. DOM is also restrictive in the way in which it loads data into memory. A programmer must use the DOM tree as the base for handling XML in the document. This can be too restrictive for many application needs. For example, most application server deployment descriptors need to be bound to specific Java classes and not DOM trees.

A streaming API for XML parsing can be implemented on top of SAX, as is described in U.S. Provisional Patent application No. 60/362,773 entitled "Streaming Parser API" by Chris Fry et al. The streaming parser takes SAX events and constructs an easily manipulated event stream that is available to the application programmer. The streaming API gives parsing control to the programmer by exposing a simple iterator-based API to the programmer. This allows the programmer to ask for the next event, or pull the event, rather than handling the event in a callback. This can give the programmer more procedural control over the processing of the XML document. The streaming API can also allow the programmer to stop processing the document, skip ahead to sections of the document, and get subsections of the document as mini DOM trees.

BRIEF SUMMARY

It is therefore desirable to deliver a solid parsing support to the entire server.

It is also desirable to develop a parsing system that has increased speed and ease of use.

It is also desirable to develop a parsing system with broad support of XML specifications.

It is also desirable to develop a parsing system that has interoperability across platform versions and releases.

A system and method for providing broad XML support can use a set of streaming parser APIs to parse an XML document. An application or client needing access to an XML document can contact an XML parser, XML processor, XML reader, or other XML processing means in order to gain access to the XML document. The XML processing means can select and instantiate a streaming parser API that is appropriate for the XML document and the client or application.

One such API is a raw streaming parser API that can provide non-validating access to the XML document. Another API is a non-validating streaming parser API, which can read information for the XML document, such as from a DTD or XML schema, and can use that information to provide access to the XML document. A validating streaming parser API, on the other hand, can read information for the XML document, such as from a DTD or XML schema, and can use that information to validate and provide access to the XML document.

The XML parser can provide a variety of types of access to the application or client that does not require the entire document to be read into memory, including providing an XML data stream, pulling XML information, and skipping unwanted XML from the document.

Other features, aspects, and objects of the invention can be obtained from a review of the specification, the figures, and the claims.

DETAILED DESCRIPTION

A system and method in accordance with the present invention can support three levels of processing: raw, non-validating, and validating with XML schemas or Document Type Definitions (DTDs). These parsers can be selected by instantiating different implementations of a streaming XML API. A pull-parser streaming API can also support data binding implementations.

Figure 1:
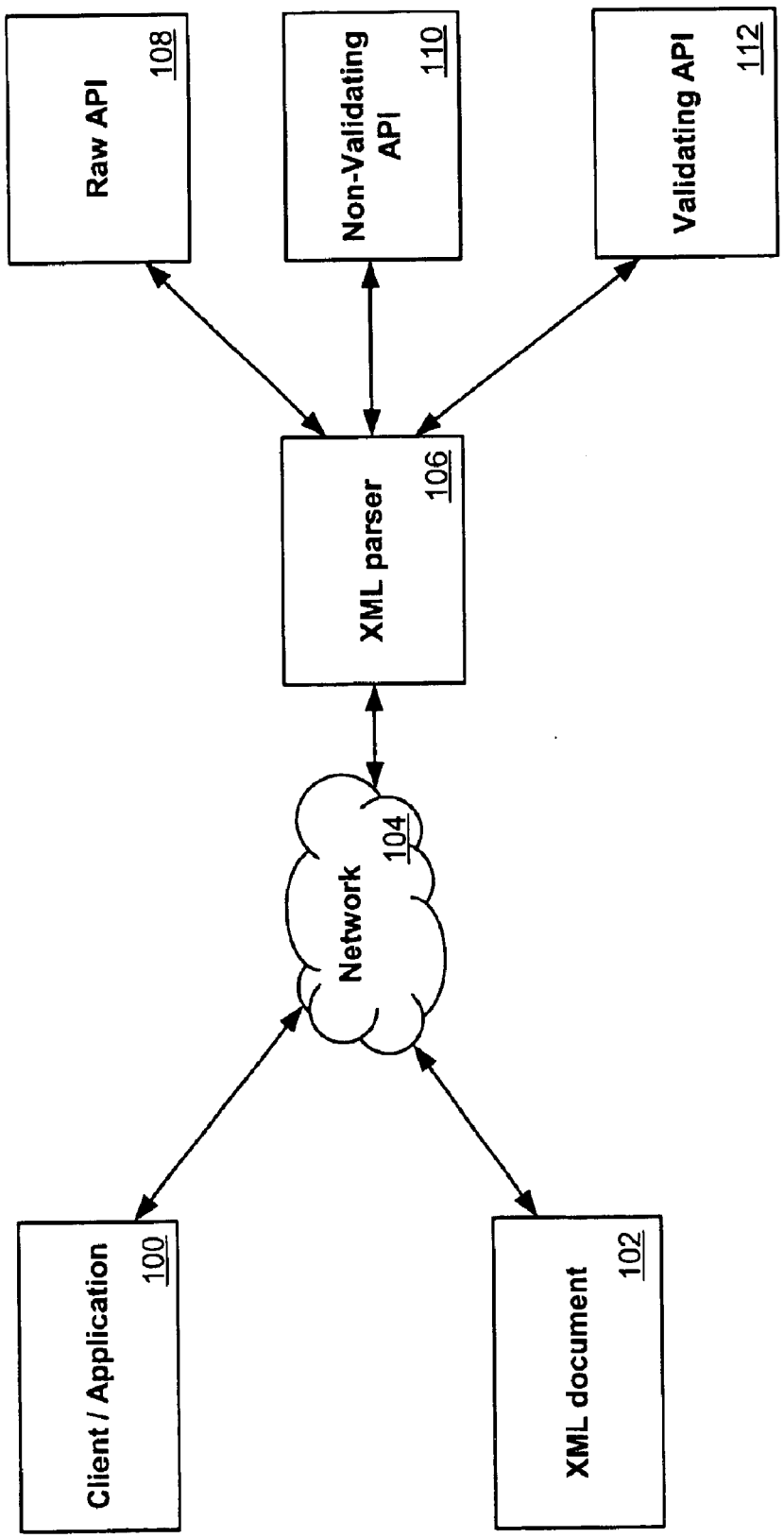
FIG. 1 is a diagram of a system that can be used in accordance with one embodiment of the present invention.

A system for processing an XML document is shown in FIG. 1. A client or application 100 can receive an XML document 102, such as through a network 104. In order to gain access to the XML document 102, the application or client 100 can utilize an XML parser 106. In order to provide for broad XML support, the XML parser 106 can have the ability to select from, and instantiate, a number of streaming parser APIs, such as a raw streaming parser API 108, a non-validating streaming parser API 110, and a validating streaming parser API 112. For raw processing, non-validating low level access to XML documents can be provided through the streaming API. This API can be useful for people who just need the raw text of the actual XML instance. This API can also serve as a foundation for other parsing support. This type of processing does not process the DTD in at least one embodiment, and can be very fast. A .NET version of this type of XML access can have several key aspects. One of these aspects is the ability to provide non-cached, forward-only, read-only access to XML. This version also implements namespaces and enforces well-formedness. This version also provides the ability to pull data, as well as the ability to skip unwanted data. The base class can also be abstracted, which can allow a user to write a unique implementation.

Figure 2:
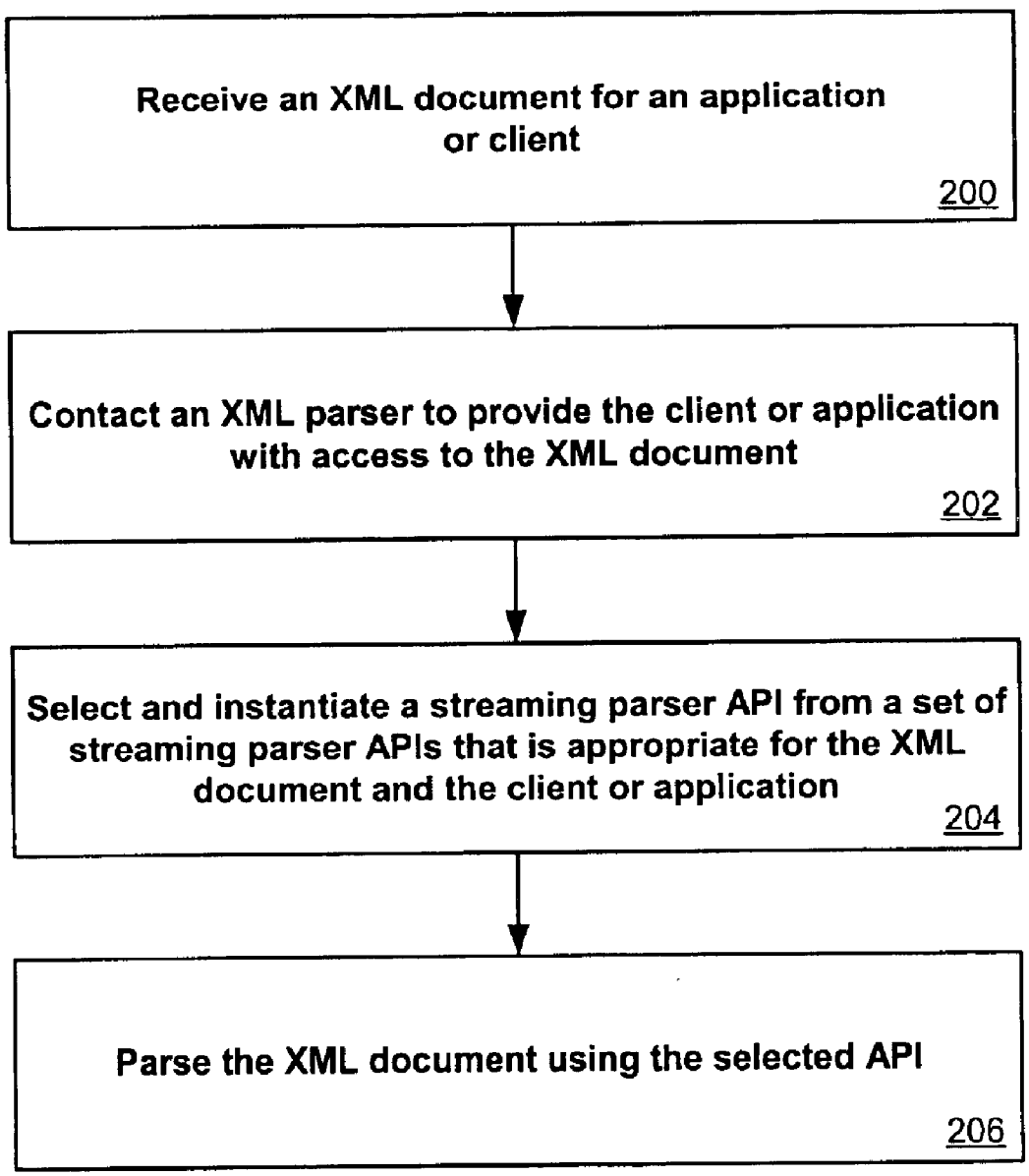
FIG. 2 is a flowchart showing a method that can be used with the system of FIG. 1.

A method that can be used with the system of FIG. 1 is shown in the steps of FIG. 2. An XML document is received by a client or application 200. The client or application can then contact an XML parser, XML processor, or XML reader to provide access to the XML document 202. The XML parser can then select and instantiate an appropriate streaming parser from a set of streaming parser APIs 204. The XML document can then be parsed using the selected API 206.

For non-validating parsing, a parser can be provided that can read the DTD and process its information to use during parsing. For validating parsing, a validating parser can be provided that reads in a schema or DTD and uses this to validate the XML document. This validation can be streaming, such that it does not require the entire document to be loaded at one time.

Streaming Parser API

A streaming API can provide an efficient way to handle XML documents that is uniquely suited to the runtime needs of an application server. A streaming API can be implemented on top of an existing XML parser. This approach can also be referred to as "pull-parsing" or "event-based processing."

A streaming API, or streaming parser, is a mechanism by which a user can request events for an XML document. It is possible to request a bunch of events that will be sent to a particular place and will generate a result object. This is done at a higher level than SAX, and is much more convenient for dealing with XML data.

Such a streaming parser for XML can be implemented, for example, on top of SAX. The streaming parser takes SAX events and constructs an easily manipulated event stream that is available to the application programmer. The streaming parser gives parsing control to the programmer by exposing a simple iteration-based API to the programmer.

A programmer can ask for the next event, or pull the next event, rather than handling the event in a callback. This gives the programmer more procedural control over the processing of the XML document. A streaming parser also allows the programmer to stop processing the document, skip ahead to specific sections of the document, and/or get subsections of the document as mini DOM trees.

Figure 3:
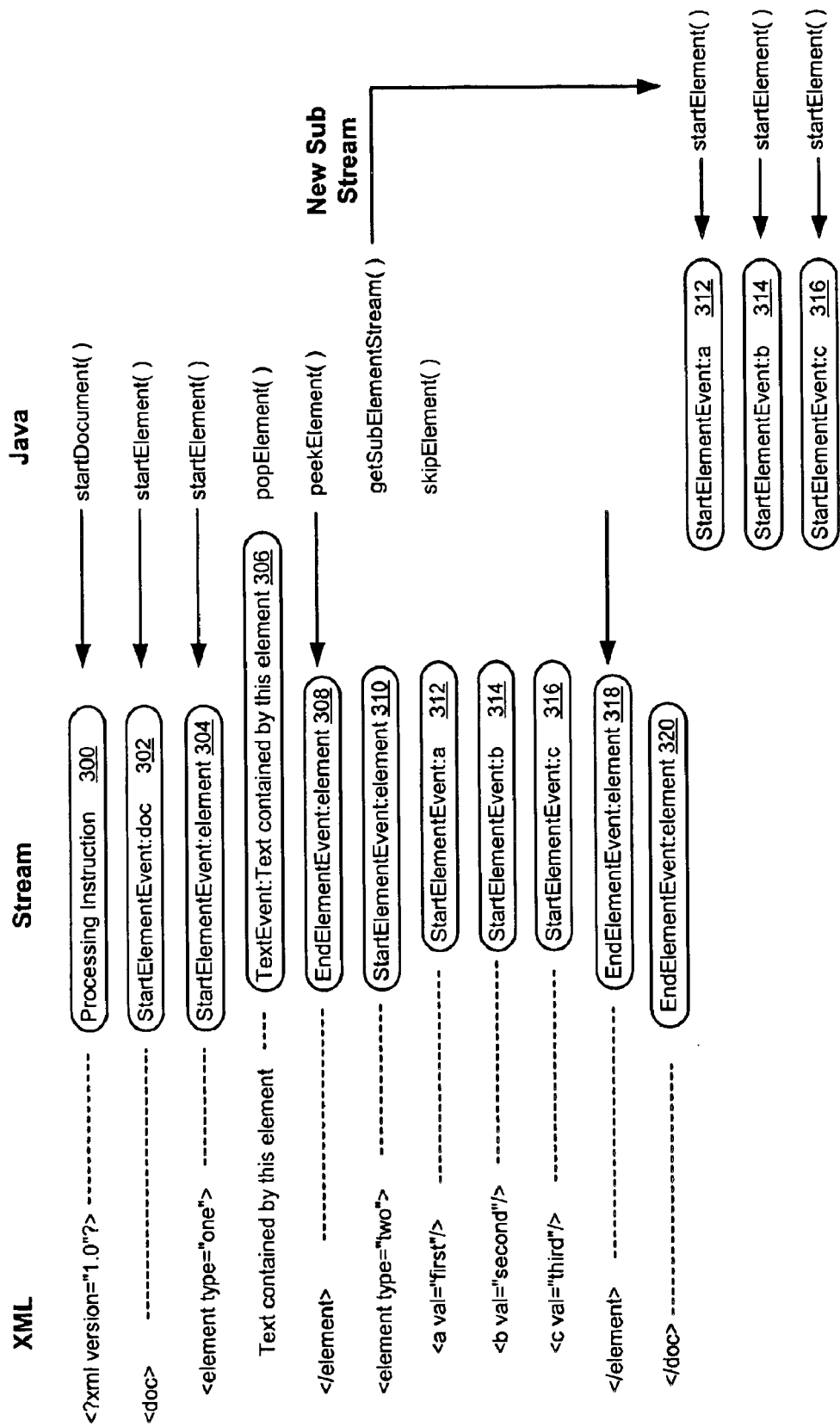
FIG. 3 is a diagram of an event stream that can be processed using the method of FIG. 2.

FIG. 3 illustrates an event stream, with methods being used to manipulate the current position in the stream. The column on the left represents the XML document, the column on the right represents the Java code, and the column in the middle represents the event stream. In the Figure, the Java method startDocument( ) is shown to correspond to the Processing Instruction 300 of the event stream, which looks to the header of the XML document. The Java method startElement( ) is called and passed with the event "doc", which corresponds to the StartElementEvent:doc event 302 or the <doc> tag in the XML document. At the first element in the body of the XML document, given here as type "one", a startElement( ) method is again called, but with the element property corresponding to StartElementEvent:element 304 event in the event stream. The text of this element in the XML document is shown as a TextEvent 306 in the event stream. In the XML document, a </element> end tag signifies the end of that element, corresponding to an EndElementEvent 308 in the event stream.

The parser would then reach element type "two" in the XML document, corresponding to another StartElementEvent:element 310 in the event stream. This would generate a substream in the Java environment to handle the second element type. Values 312, 314, 316 of element type "two" are placed onto the event stream and correspond to the Java substream. Element type "two" ends when another end tag is reached in the document, corresponding to an EndElementEvent 318 in the event stream, with another EndElementEvent 320 corresponding to the end of document tag </doc>.

In a method for utilizing such an event stream, the name of an element to be extracted from the XML document is passed to an iterative method built on top of a base parser, such as a SAX API or DOM parser. An element tag of the XML document is located and the element type read by the base parser, without necessarily reading the sub-elements or text of that element. The elements of the XML document are then stepped through by the base parser in combination with the iterative method until the element to be extracted is located, read, and processed by the base parser. An event is generated, that is related to the element, and placed on an event stream for use by an application such as a Java application.

A public access point to an XML processor can take the form of an interface, such as an XMLEventStream interface.

A concrete implementation of such an interface or API can be in a class such as an XMLEventStream class. With an event stream, a programmer controls the parser rather than having to write a handler for the parser. The stream can be thought of as pointing to different positions in a document. When different methods are called, the methods can manipulate a pointer in the document and return certain information about the elements surrounding that point.

The streaming parser can extend the base parser and expose a single method to the XMLEventStream class. This single method, such as for example streamParseSome( ), can put all the XML events generated by this call onto the stream.

The base parser can be relied upon to handle the guts of the XML processing, forming the base class for all XML processors in the parsing paradigm, including for example the StreamParser and SAXDriver. The base parser iterates over XML Elements, which can then be encapsulated in the Element class. Currently, StreamEvents are created by a factory that accepts Elements and generates events. The same model can be used to create SAXEvents from XML events. The base parser can enforce higher-level well-formedness constraints, such as proper element nesting and proper namespace declaration and scoping.

One streaming parser that can be used in accordance with the present invention is based on a standard API called JAXP, or Java API for XML Processing. JAXP makes it easier to deal with parsing tasks, and makes it possible to handle some vendor-specific tasks. JAXP does not provide parsing functionality, but provides a way to get to XML parsers. The JAXP classes typically sit on top of an existing parser. The JAXP API can be hooked up to a management system, which can include a console that is accessible to users. The JAXP API can be plugged directly into a configuration system, and can be used to select an XML parser in order to process XML. The selected XML parser reads the XML and converts it into an object that a Java application can read.

JAXP can utilize a SAX protocol comprising a series of callbacks. A "start" callback, for example, can be invoked every time an opening tag is encountered in an XML document by a SAX parser. SAX provides a class called "HandlerBase" that implements the callbacks and provides default implementations of the callback methods. A SAX developer needs to extend the HandlerBase class and implement methods that require the insertion of specific logic. The key is to provide code for these various callbacks, then allow a parser to trigger the callbacks as necessary. The SAX component of JAXP provides a relatively simple way to accomplish this task.

JAXP allows a programmer to provide a parser as a Java system property. In this way, changing the parser being used requires only a change in classpath setting to move from one parser implementation to another. Changing the parser does not require any code recompilation.

The process of dealing with DOM in JAXP is similar to the process of dealing with SAX. As described above, DOM utilizes an in-memory tree structure including nodes to represent elements, attributes, and other XML constructs. With DOM, JAXP does not have to fire callbacks as it does for SAX, instead being responsible only for returning a DOM document object as a result of parsing. DOM methods are similar to SAX methods, except that variations of a parse method do not take an instance of the SAX HandlerBase class, but instead return a DOM Document instance representing the XML document that was parsed.

There are many different XML parsers which can be based on SAX or DOM, and users may want to be able to plug one of these parsers into an application without changing their code. Since the parsers operate using certain minimum standards, JAXP can allow for the addition of one of these parsers by configuring the appropriate mechanisms.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system for parsing an XML document, comprising:
   a streaming parser;
   a set of streaming parser APIs that interface with said streaming parser, from which set one of said streaming parser APIs is selected and instantiated by said streaming parser to parse said XML document, and including within said set
      a raw streaming parser API for providing non-validating access to said XML document,
      a non-validating streaming parser API for reading information for said XML document and using that information to provide access to the XML document, and
      a validating streaming parser API for reading information for said XML document and using that information to validate and provide access to the XML document; and
   means for selecting and instantiating one of said set of streaming parser APIs to provide access to, and parse, said XML document.

2. A system according to claim 1, wherein said raw streaming parser API provides the raw text of the XML document.

3. A system according to claim 1, wherein said raw streaming parser provides non-cached access to the XML document.

4. A system according to claim 1, wherein said raw streaming parser API provides read-only access to the XML document.

5. A system according to claim 1, wherein said raw streaming parser API implements namespaces.

6. A system according to claim 1, wherein said raw streaming parser API enforces well-formedness of the XML document.

7. A system according to claim 1, wherein said raw streaming parser API can pull data from the XML document.

8. A system according to claim 1, wherein said raw streaming parser API can skip unwanted data in the XML document.

9. A system according to claim 1, wherein said non-validating streaming parser API reads information for the XML document from one of a DTD and XML schema.

10. A system according to claim 1, wherein said validating streaming parser API reads information for the XML document from one of a DTD and XML schema.

11. A system according to claim 1, wherein said validating streaming parser API does a streaming validation of the XML document.

12. A system according to claim 1, wherein said validating streaming parser API does not require the loading of the entire XML document into memory.

13. A system according to claim 1, wherein the selected streaming parser API is appropriate for the XML document and a client application that uses said streaming parser API.

14. A method for parsing an XML document, comprising the steps of:

receiving an XML document;

providing a set of streaming parser APIs that interface with a streaming parser, wherein said set of streaming parser APIs include
- a raw streaming parser API for providing non-validating access to said XML document,
- a non-validating streaming parser API for reading information for said XML document and using that information to provide access to the XML document, and
- a validating streaming parser API for reading information for said XML document and using that information to validate and provide access to the XML document;

selecting a streaming parser API from said set of streaming parser APIs; and, instantiating said streaming parser API to provide access to, and parse, said XML document.

15. A method according to claim 14, wherein the selected streaming parser API is appropriate for the XML document and a client application that uses said streaming parser API.

16. A system for parsing an XML document, comprising:

a streaming parser;

a set of streaming parser APIs that interface with said streaming parser, from which set at least two of said streaming parser APIs are selected and instantiated by said streaming parser to parse said XML document, and including within said set
- a raw streaming parser API for providing non-validating access to said XML document,
- a non-validating streaming parser API for reading information for said XML document and using that information to provide access to the XML document, and
- a validating streaming parser API for reading information for said XML document and using that information to validate and provide access to the XML document; and means for selecting and instantiating at least two of said set of streaming parser APIs to provide access to, and parse, said XML document.

17. A method for parsing an XML document, comprising the steps of:

receiving an XML document;

providing a set of streaming parser APIs that interface with a streaming parser, wherein said set of streaming parser APIs include
- a raw streaming parser API for providing non-validating access to said XML document,
- a non-validating streaming parser API for reading information for said XML document and using that information to provide access to the XML document, and
- a validating streaming parser API for reading information for said XML document and using that information to validate and provide access to the XML document;

selecting at least two streaming parser APIs from said set of streaming parser APIs; and, instantiating the selected streaming parser APIs to provide access to, and parse, said XML document.

* * * * *